April 25, 1967     C. A. CHANDLER     3,315,932

MAGNIFYING MIRROR APPARATUS

Filed May 20, 1965

INVENTOR.
CHARLES A. CHANDLER
BY Fulwider, Patton, Rieber,
Lee and Utecht
ATTORNEYS

United States Patent Office 3,315,932
Patented Apr. 25, 1967

3,315,932
MAGNIFYING MIRROR APPARATUS
Charles A. Chandler, 4223 Chatwin Ave.,
Lakewood, Calif. 90713
Filed May 20, 1965, Ser. No. 457,274
11 Claims. (Cl. 248—226)

The present invention relates generally to mirrors and more particularly to a new and novel magnifying mirror attachment for use with a conventional cabinet mirror.

The use of a magnifying mirror when applying feminine makeup and during shaving by men is very desirable. Heretofore proposed mountings for such mirrors, however, have proven completely inadequate. It is a major object of the present invention to provide a new and novel apparatus for attaching a magnifying mirror to a conventional cabinet mirror in such a manner that the magnifying mirror may find convenient use.

Another object of the present invention is to provide magnifying mirror apparatus attachable to a conventional cabinet mirror in such a manner that the magnifying mirror may be readily adjusted at a desired height for various uses, and when once arranged at such height, the magnifying mirror will remain securely positioned until such time as it becomes desirable to change its height adjustment.

An additional object of the present invention is to provide magnifying mirror apparatus of the aforedescribed nature which is readily securable to conventional cabinet mirrors of varying heights.

A further object of the present invention is to provide magnifying mirror apparatus of the aforedescribed nature that is economical of manufacture and will provide a long and trouble-free service life.

These and other objects and advantages of the present invention will become apparent from the following detailed description of a preferred embodiment thereof, when taken in conjunction with the appended drawings wherein.

Figure 1:
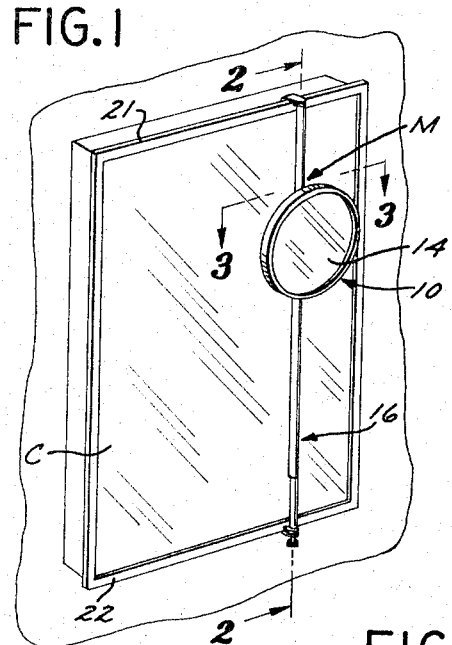
FIG. 1 is a perspective view showing magnifying mirror apparatus embodying the present invention attached to a conventional cabinet mirror.

Referring to the drawings, a preferred form of magnifying mirror apparatus M is shown attached to a conventional medicine cabinet mirror C. The magnifying mirror apparatus M includes a conventional, circular magnifying mirror, generally designated 10, having a circular frame 12 within which is mounted a magnifying mirror glass 14. The magnifying mirror 10 is vertically slidably carried by an upstanding post, generally designated 16. The post 16 in turn is adjustable in height. The upper and lower ends of the post 16 are secured to mounting brackets 18 and 20, respectively, that engage the upper and lower frame elements 21 and 22 of the cabinet mirror C.

The magnifying mirror frame 12 is connected to the post 16 by a support bracket, generally designated 24.

Figure 2:
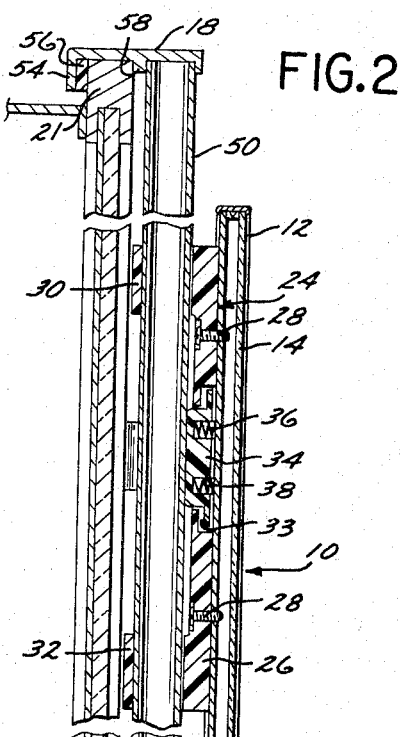
FIG. 2 is a broken central vertical sectional view taken in enlarged scale along line 2—2 of FIG. 1.
Figure 3:
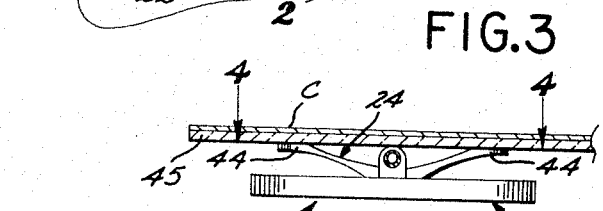
FIG. 3 is a horizontal sectional view taken in enlarged scale along line 3—3 of FIG. 1.
Figure 4:
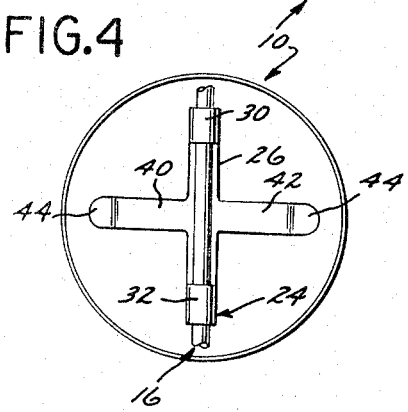
FIG. 4 is a broken vertical sectional view taken on line 4—4 of FIG. 3.

Referring particularly to FIGS. 2, 3 and 4, the support bracket 24 includes a vertical leg 26 that is rigidly affixed to the magnifying mirror frame 12 by screws 28. The upper and lower ends of the leg 26 are formed with upper and lower tubular mounts 30 and 32, respectively, that are slidably received by the post 16. The midportion of the leg 26 is formed with a pocket 33. A pressure pad 34 is disposed within the pocket 33. A pair of coil compression springs 36 carried within blind bores 38 formed in the front portion of the pressure pad abut the reverse side of the magnifying mirror 12 so as to constantly bias the pressure pad 34 rearwardly into frictional engagement with the front of the post 16. The midportion of the leg 26 is also integrally formed with a pair of rearwardly and outwardly extending arms 40 and 42. The free ends of these arms 40 and 42 are provided with pads 44. The rear surfaces of these pads 44 are in frictional engagement with the front surface of the cabinet mirror glass 45.

The post 16 includes an outer tube 50, the lower portion of which telescopically slidably receives an inner tube 52. The upper end of the outer tube 50 is rigidly affixed to mounting bracket 18. The rear end of the mounting bracket 18 is formed with a depending lip 54. A resilient spacer 56 is adhered to the front surface of the lip 54. A downwardly extending retainer 58 is formed at the midportion of the bracket 18 with the upper frame element 21 of the cabinet miror M being received between the rear surface of the retainer 58 and the front surface of the resilient spacer 56. The lower mounting bracket 20 is similar in construction except that it is formed at its forward portion with a vertical bore 60.

Figure 5:
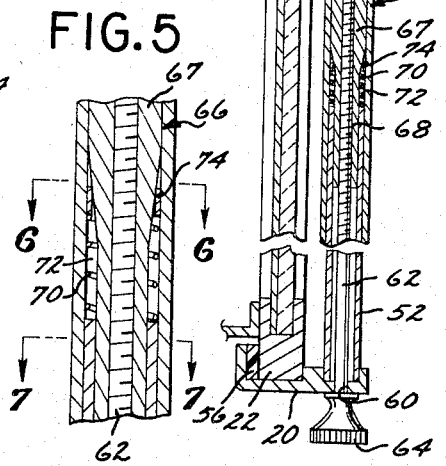
FIG. 5 is a fragmentary central vertical sectional view in further enlarged scale showing a detail of FIG. 2.
Figure 7:
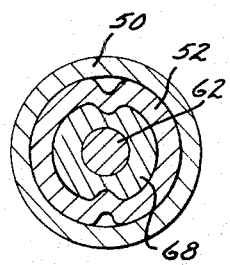
FIG. 7 is a horizontal sectional view taken along line 7—7 of FIG. 5.
Figure 6:
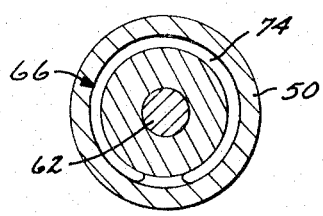
FIG. 6 is a horizontal sectional view taken along line 6—6 of FIG. 5.

The lower bracket 20 is rigidly affixed to the lower end of the inner tube 52. An upwardly extending adjustment screw 62 is disposed within the inner tube 52, the lower portion of such adjustment screw extending downwardly through the aforementioned bore 60 formed in lower bracket 20. A thumb nut 64 is keyed to the lower end of the adjustment screw 62. The upper portion of the adjustment screw 62 is threadably disposed within an adjustment plug, generally designated 66. The upper portion of the adjustment plug 66 is enlarged as indicated at 67 whereby it is vertically slidably movable within the outer tube 50, while the lower portion of the adjustment plug 66 tapers inwardly, as indicated at 68. A coil compression spring 70 is interposed in the space 72 between the underside of the enlarged upper portion 67 of the adjustment plug 66 and the upper surface of the inner tube 52, as indicated particularly in FIG. 5. As is also indicated in FIG. 5, as well as in FIG. 6, a split ring 74 is positioned above the coil compression spring 70. This split ring 74 is formed of a resilient material such as spring steel. As indicated particularly in FIG. 7, the inner tube 52 is formed with a pair of vertical radially inwardly extending tongues 76 that slidingly mate with a complementary pair of vertical grooves 78 formed in the lower portion 68 of the adjustment plug 66.

In the use of the aforedescribed apparatus, the mounting brackets 18 and 20 are engaged with the upper and lower frame elements 21 and 22 of the cabinet mirror C by adjusting the length of the post 16. Such adjustment is obtained by first backing off the adjustment screw 62 until, with the upper mounting bracket 18 positioned on medicine cabinet frame element 21 as indicated in FIG. 2, the lower mounting bracket 20 is disposed below the lower frame element 22 of the cabinet mirror C. Thereafter, in order to move the lower mounting bracket 20 upwardly into engagement with the lower frame element 22, the thumb nut 64 and hence the adjustment screw 62 are rotated in such a manner as to pull the adjustment plug 66 downwardly within outer tube 50. As the adjustment plug 66 moves downwardly it will force the split ring 74 downwardly within the outer tube 50. In this manner the coil compression spring 70 will be gradually compressed and the split ring 74 will be expanded outwardly so as to lock the adjustment plug 66 against vertical movement relative to the inner tube 50. Continued turning of the thumb nut 64 will then draw the lower mounting bracket 20 upwardly until it is tightly engaged with the lower frame element 22 of the cabinet mirror C. At this time the upper mounting bracket 18 will be tightly engaged with the upper frame element 21 of the cabinet mirror C. The post 16 will then be firmly attached to the cabinet mirror C with the adjustment screw 62 restrained against rotation. It should be noted that the provision of the resilient spacers 56 in mounting brackets 18 and 20 permit such brackets to accommodate cabinet mirrors C of varying widths.

With the post 16 positioned on the cabinet mirror 1C, the magnifying mirror M may be slid vertically along such post to the desired height for a particular user. Vertical movement of the magnifying mirror M is yieldingly restrained by the engagement of the pressure pad 34 of support bracket 24 with the front of the outer tube 50, as well as by the frictional engagement between the pads 44 and the front surface of the mirror glass 45. This frictional engagement should be sufficient to prevent accidental vertical movement of the magnifying mirror M in the event the magnifying mirror is accidentally contacted by the user and also during opening and closing of the cabinet mirror C. The engagement of the pads 44 with the front surface of the cabinet mirror C will also positively maintain the magnifying mirror M against rotation relative to the post 60. In this manner the magnifying mirror M will remain stationary during its use.

From the foregoing description it will be apparent that the magnifying mirror apparatus of the present invention will find use with medicine cabinets of all standard sizes. When once engaged with such medicine cabinet, the magnifying mirror apparatus of the present invention will remain firmly locked in place until such time as it may become desirable to remove it from the medicine cabinet. The magnifying mirror M may be readily adjusted at a desired height and when once adjusted at such height it will remain locked in this position until it is desired to again adjust its height.

Various modifications and changes may be made with respect to the foregoing detailed description without departing from the spirit of the invention or the scope of the following claims.

I claim:

1. Magnifying mirror apparatus for use with a cabinet mirror, comprising:
   a magnifying mirror;
   a vertical post;
   upper and lower mounting brackets on the upper and lower ends of said post engageable with said cabinet mirror;
   a support bracket having a vertical leg secured to the back of said magnifying mirror, with the upper and lower ends of said leg being formed with tubular mounts slidably received by said post, said support bracket also having a pair of rearwardly and outwardly extending arms formed on their free ends with pads that frictionally engage the front of said cabinet mirror;
   and a pressure pad carried by the vertical leg of said support bracket, said pressure pad being biased into frictional engagement with the front of said vertical post.

2. Apparatus as set forth in claim 1 wherein the length of said post is adjustable.

3. Apparatus as set forth in claim 1 wherein each of said mounting brackets is formed with horizontally spaced vertical surfaces that receive the upper and lower ends of said cabinet mirror, and a spacer is disposed upon one of said vertical surfaces.

4. Apparatus as set forth in claim 3 wherein the length of said post is adjustable.

5. Magnifying mirror apparatus for use with a cabinet mirror, comprising:
   a vertical post that includes an outer tube and an inner tube slidably telescopically disposed within the lower portion of said outer tube;
   an upper mounting bracket engageable with the upper end of said cabinet mirror secured to the upper end of said outer tube;
   a lower mounting bracket engageable with the lower end of said cabinet mirror secured to the lower end of said inner tube;
   an adjustment screw rotatably disposed within said inner tube;
   an adjustment plug slidably disposed within said tubes and threadably engaged by said adjustment screw so as to be moved vertically by rotation of said screw, said plug having an enlarged upper portion in said outer tube that tapers downwardly to a reduced-diameter lower portion in said inner tube, said plug and said inner tube being locked against relative vertical movement;
   a resilient split ring carried on the tapered portion of said plug;
   a coil compression spring interposed between the underside of said ring and the upper end of said inner tube;
   a support bracket connecting said magnifying mirror to said post;
   and restraining means on said support bracket engageable with said post to position said magnifying mirror at a desired height on said post.

6. Apparatus as set forth in claim 5 wherein each of said mounting brackets is formed with horizontally spaced vertical surfaces that receive the upper and lower ends of said cabinet mirror, and a spacer is disposed upon one of said vertical surfaces.

7. Apparatus as set forth in claim 5 wherein said support bracket has a vertical leg secured to the back of said magnifying mirror, with the upper and lower ends of said leg being formed with tubular mounts slideably received by said post, said support bracket also having a pair of rearwardly and outwardly extending arms formed on their free ends with pads that frictionally engage the front of said cabinet mirror, and said support bracket also having a pressure pad carried by the vertical leg of said support bracket, said pressure pad being biased into frictional engagement with the front of said cabinet mirror.

8. Apparatus as set forth in claim 7 wherein each of said mounting brackets is formed with horizontally spaced vertical surfaces that receive the upper and lower ends of said cabinet mirror, and a resilient spacer is disposed upon one of said vertical surfaces.

9. Magnifying mirror apparatus for use with a cabinet mirror, comprising:
   a magnifying mirror;
   a vertical post that is adjustable in length;
   upper and lower mounting brackets on the upper and lower ends of said post engageable with said cabinet mirror;

a support bracket connecting said magnifying mirror to said post;

and restraining means on said support bracket engageable with said post to position said magnifying mirror at a desired height on said post.

10. Apparatus as set forth in claim 9 wherein each of said mounting brackets is formed with horizontally spaced vertical surfaces that receive the upper and lower ends of said cabinet mirror, and a spacer is disposed upon one of said vertical surfaces.

11. Apparatus as set forth in claim 10 wherein the length of said post is adjustable.

References Cited by the Examiner

UNITED STATES PATENTS

| | | | |
|---|---|---|---|
| 722,828 | 3/1903 | Fergusson | 248—226 |
| 1,368,125 | 2/11921 | Durett | 248—201 |
| 1,888,703 | 11/1932 | Summerbell | 248—298 |
| 2,199,731 | 5/1940 | Pryne | 312—310 |
| 2,341,048 | 2/1944 | Kopp | 248—226 |
| 2,780,960 | 2/1957 | Miller | 88—100 |

CLAUDE A. LE ROY, *Primary Examiner.*

J. F. FOSS, *Assistant Examiner.*